July 18, 1933.  G. M. CROSS  1,918,322
CUSHIONING DEVICE
Filed April 6, 1927  2 Sheets-Sheet 1

July 18, 1933.   G. M. CROSS   1,918,322
CUSHIONING DEVICE
Filed April 6, 1927   2 Sheets-Sheet 2

Patented July 18, 1933

1,918,322

UNITED STATES PATENT OFFICE

GROSVENOR M. CROSS, OF BELVEDERE, CALIFORNIA

CUSHIONING DEVICE

Application filed April 6, 1927. Serial No. 181,426.

The present invention relates particularly to a cushioning device to maintain a movable and fixed, or two movable bodies in suspended relation.

An object of the invention is to provide the body of a vehicle, especially of the motor driven type, with resilient means for directly absorbing and dissipating all shocks or jars to which the vehicle wheel or wheels are subjected, without causing undue strain on either the wheel or its axle, and to eliminate to the theoretically maximum possible extent, the transmission of excessive vibration to the supported vehicle body or load.

A further object of the invention is to provide a resilient suspension to be used as a cushioning element between relatively movable and immovable bodies, for the purpose of obtaining resilient support, otherwise possessing the desirable features of steel leaf springs.

A still further object of the invention is to provide a hydro-pneumatic suspension device to be interposed between the body and running gear of a vehicle, that comprises a fluid filled cylinder having a plunger and valve mechanism therein operated by relative movement of the vehicle body and running gear, to regulate and control any and all movement of the vehicle running gear relative to the body, and vice-versa.

Other objects of the invention are to provide a hydro-pneumatic spring device for vehicles that will automatically adjust itself to load variation, whereby the mechanism will function equally well whether the vehicle is carrying a light or heavy load; a suspension device that will absorb and dissipate any and all relative movement between a vehicle body and the running gear thereof, a hydro-pneumatic cushioning device constructed so as to avoid similarity in operation and structure to conventional types of vehicle springs; and a resilient suspension device for vehicles that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings

Figure 1:
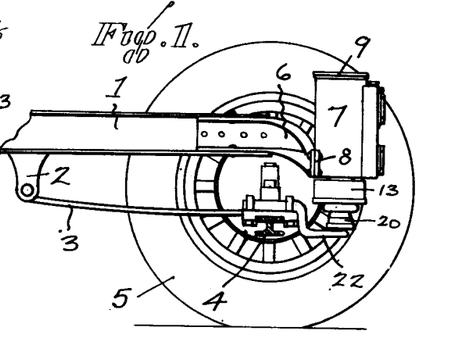
Fig. 1 represents a side elevation of a vehicle body and running gear having a resilient cushioning device constructed in accordance with my invention operatively applied thereto.

In detail, the construction illustrated in the drawings comprises the body of a vehicle, of which I show only one of the frame members 1, having a bracket 2 depending therefrom. A radius rod 3 is pivotally connected to the frame bracket, and at its other end secured to an axle 4 which is a part of the running gear of the vehicle. The usual traction wheels 5 are provided on the opposite ends of the axle in accordance with standard automotive practice.

Figures 2, 6, 7:
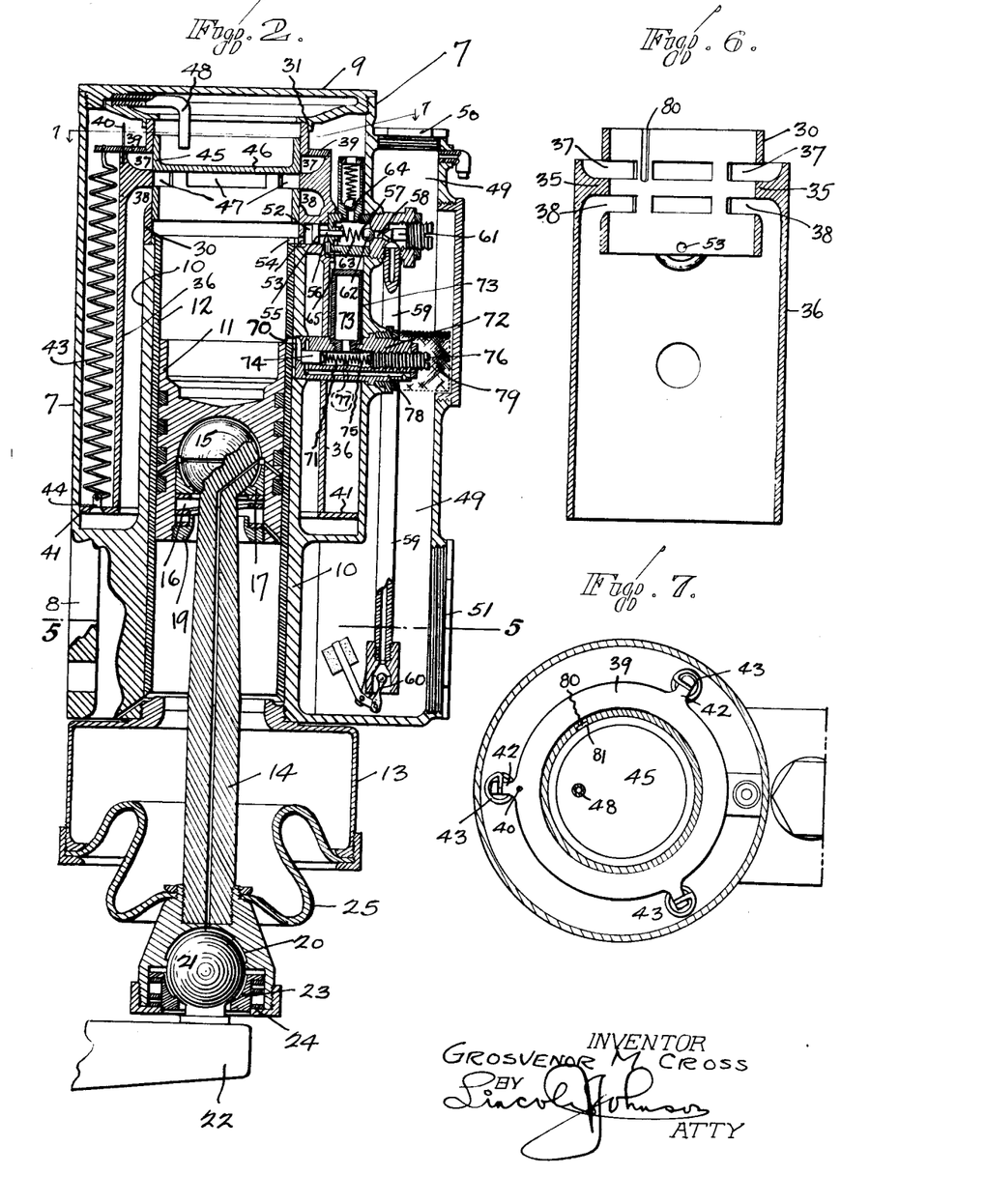
Fig. 2 is an enlarged vertical section taken through a hydro-pneumatic cushioning structure constructed in accordance with my invention.
Fig. 6 is a vertical section through the valve sleeve and skirt.
Fig. 7 is a cross section, taken on the line 7—7 of Figure 2, looking down.

A plate 6 is securely mounted on the end of the frame 1, and a cylindrical casing 7 is bolted to the frame plate at 8. The casing 7 is closed at its upper end by a cap 9. A cylinder 10 is arranged centrally within the casing 7 and a piston 11 is reciprocatingly confined within the cylinder 10. To provide a true guide for the piston 11, I have interposed a wear sleeve 12 between the piston 11 and cylinder 10. An open ended cylindrical housing 13 is engaged with the open end of the casing 7.

A connecting rod 14 having a ball 15 on the end thereof is universally confined within a socket 16 located on the under side of the piston 11. In order to hold the connecting rod end in the universal engagement with the piston 11, a spring urged washer 17 is engaged thereunder. The washer 17 is held in the piston socket by a lock nut 19. The opposite end of the connecting rod 14 is provided with a socket 20 therein to receive a ball 21 that is mounted on the end of a bar 22 that is fixedly secured to the axle 4. A locking ring 23 and a resilient washer assembly 24 encloses the end of the connecting rod socket 20 to engage with the ball 21 on the bar 22.

Although I have shown a ball connection on both ends of the connecting rod, it is to be understood that it would be within the scope of the invention to substitute a different type of connection thereon. The connecting rod is drilled lengthwise with a lubricant passage which connects at one end with oil passages in the piston, through which lubricant is scraped from the cylinder wall. The lubricant is thus conveyed to the universal joints at both ends of the connecting rod. A flexible tubular covering 25 encases the end of the connecting rod 14 that projects from the casing 7 to prevent dust, dirt and deleterious matter from entering into the interior of the casing 7 and interfering with the operation of the piston. An end of the covering material 25 is secured to the open bottom of the housing 13 while the opposite end of said covering 25 is secured to the socket adjacent the lower end of the connecting rod 14. Relative movement between the axle bar 22 and the casing 7 causes the connecting rod 14 and piston 11 to reciprocate relative to the cylinder 10 within the casing 7. The universal connection of the connecting rod 14 to both the piston 11 and axle bar 22 permits the piston 11 to slide up or down within the cylinder 10 irrespective of any irregular road surface conditions that may be encountered by the vehicle running gear.

The cylinder 10 is arranged concentrically within the casing 7, and the outer diameter of the cylinder 10 is less than the inner diameter of the casing 7 whereby a space is formed between the cylinder 10 and the casing 7. The upper end of the cylinder 10 is spaced below the capped end of the cylinder casing 7. A sleeve 30 is interposed between the end of the cylinder 10 and the cap 9 that closes the end of the casing 7. The lower end of the sleeve 30 bears on the upper end edge of the cylinder 10 while the opposite end of said sleeve 30 rests in an annular shoulder 31 that is formed on the bottom side of the casing cap. The center of the bottom extension on the casing cap, within the sleeve 30, is cut away for the purpose to be hereinafter explained.

The inner face of the sleeve 30 is provided with a guide slot 80 extending down from the upper edge thereof to receive a pin 81 on the valve 45. The pin 81 on the valve is free to slide up or down in the slot but the valve 45 is prevented from rotating so that the ports in said valve will always register with the ports in the sleeve.

An annular shoulder 35 is provided around the exterior of the sleeve 30 and a circular skirt 36 is joined at one end to the shoulder 35. The skirt 36 is concentric with the axis of the sleeve 30 and lies in concentric relation to the cylinder 10, when mounted within the casing 7. A plurality of circumferential ports 37 are cut through the sleeve 30 above the shoulders 35 while a similar series of circumferential ports 38 are cut through the sleeve 30 below the shoulder 35. A ring valve 39 is slidably mounted around the sleeve 30 above the shoulder 35 and said valve 39 entirely covers the space between the exterior of the sleeve 30 and the upper end edge of the skirt 36. A guide pin 40 projects from the upper end edge of the skirt 36 to guide the ring valve 39 in its vertical movement relative to the upper end edge of the skirt 36.

A ring valve 41 is slidably confined in the lower end of the casing 7, said valve 41 having an outside diameter substantially the same as the inside diameter of the casing 7. The valve 41 is adapted to butt against the lower end edge of the skirt 36 and to close the space between the lower end edge of the skirt 36 and the casing wall. The upper ring valve 39 is provided with a plurality of horns 42 thereon around which the ends of a plurality of tension springs 43 are secured, the opposite ends of said tension springs being secured to the pins 44 attached to the inside face of the bottom ring valve 41. The springs 43 are of sufficient tension to normally keep both the upper ring valve 39 and the lower ring valve 44 seated on the respective opposite ends of the skirt 36.

Figure 3:
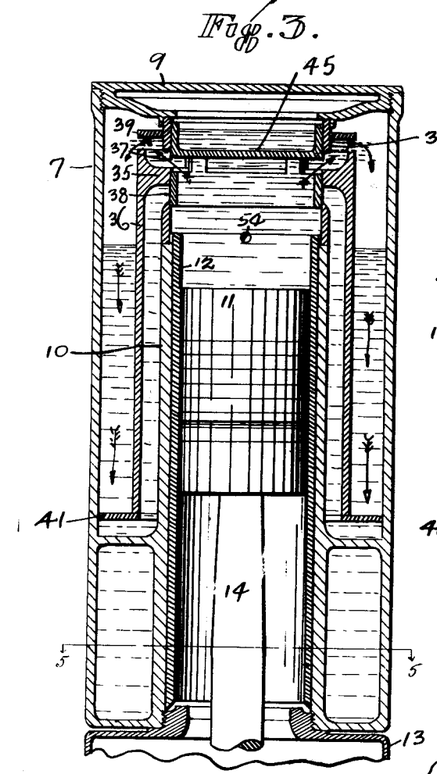
Fig. 3 is a vertical section similar to Fig. 2, showing the movable element operated by the vehicle running gear on the up-stroke and the valves operated thereby in the open position.
Figure 4:
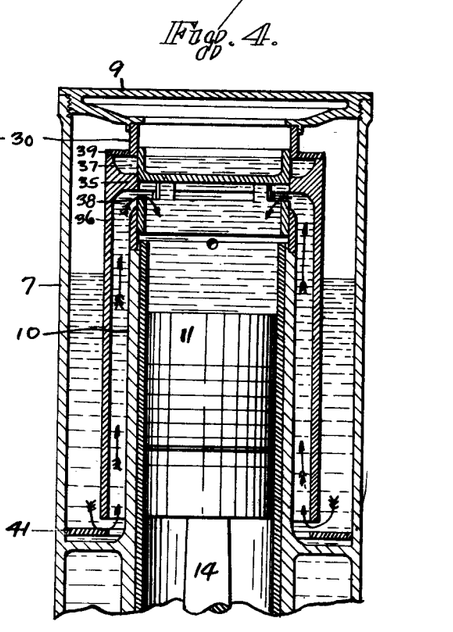
Fig. 4 is a vertical section similar to Fig. 3 showing the movable element on the down stroke and the valves operated thereby in the open position.
Figure 5:
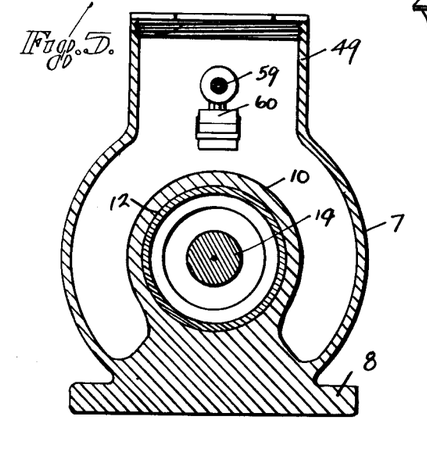
Fig. 5 is a cross section taken through Fig. 2 on the line 5—5.

A valve 45 having an outside diameter substantially the same as the inside diameter of the sleeve 30 is slidably mounted within the sleeve 30. The valve 45 is closed, at 46, adjacent an end thereof and the periphery of the valve 45 adjacent the closed end 46 thereof, is provided with a plurality of circumferentially disposed ports 47 therein. The ports 47 are arranged in the valve 45 intermediate the opposite ends of the valve and the width of the ports 47 is equal to the width of the annular shoulder 35 that is arranged between the ports 37 and 38 around the sleeve 30. Thus when the ports 47 in the valve 45 register with the shoulder 35 on the sleeve 30, the ports 37 through the said sleeve are closed by an end of the valve 45 while the ports 38 are closed by the opposite end of the valve 45, as shown in Fig. 2. When the piston 11 is moved upwardly in the cylinder, the fluid confined in the said cylinder will move upwardly with the piston and cause the valve 45 to move upwardly relative to the sleeve 30 to bring the ports 47 in the valve 45 into registry with the ports 37 in the sleeve 30, as shown in Fig. 3. During such time as the ports 47 and 37 are in registration, the lower end of the valve 45 keeps the ports 38 in the sleeve 30 covered. Downward movement of the valve 45 as shown in Fig. 4 brings the valve ports 47 into communication with the sleeve ports 38 and causes the upper end of the valve 45 to cover the sleeve ports 37. A vent pipe 48 communicates the space around the upper end of the casing 7 with the interior of the chamber formed by the closed valve 45 and the casing cap. The pipe 48 serves to equalize the air pressures in the cap 8 and above the fluid level.

A fluid reservoir 49 is formed on the casing 7 having a fluid filling inlet 50 at one end thereof, and a capped outlet 51 at the bottom thereof. The fluid supply to be worked on by the piston 11 is stored in the reservoir 49 and automatically drawn into the cylinder 10 to maintain a predetermined volume of fluid within the said cylinder 10 and in the space between the cylinder and casing to suit working conditions. The mechanism for feeding the fluid from the supply in the reservoir 49 into the cylinder 10 consists of a chamber 52 formed between the sleeve 30 and the skirt 36. The chamber 52 is provided with a port 53 therein that registers with a corresponding port 54 formed in the side of the cylinder wall 10. A piston 55 is reciprocatingly mounted in the chamber 52, and said piston has a stem 56 thereon that reciprocates within a pump chamber 57. The piston chamber 52 and pump chamber 57 are arranged in axial alignment. The pump chamber 57 is provided with an intake port 58 therein that communicates with a conduit 59 through which the fluid supply is passed from the reservoir 49 to the pump chamber. The supply pipe 59 extends lengthwise in the reservoir 49 and the lower end of the pipe 59 is positioned approximately at the bottom of the reservoir 49, to insure that practically all of the oil from the reservoir 49 can be drawn into the pumping mechanism. The bottom of the pipe 59 is provided with a float controlled check valve 60 thereon, to close the open end of said pipe 59 when the supply of fluid in the reservoir 49 should become dangerously low, to prevent air from being sucked into the pumping system. An adjustable needle valve 61 is provided in the pumping system adjacent the intake valve 58 to regulate and control the speed at which the fluid will be sucked into the pump chamber 57. A ball check valve 62 is arranged in the pump chamber 57 over the intake 58 to permit a supply of fluid to be sucked into the chamber 57 but to prevent such fluid from being forced back through the intake port. An expansion spring 63 bears against the ball valve 62 to keep it seated over the intake port 58. The tension of the spring 63 is light enough to permit fluid to be drawn into the pump chamber 57. Fluid drawn into the pump chamber 57 is discharged therefrom out through a ball check valve 64 into the interior of the casing 7 whence it passes into the cylinder 10 and performs useful work.

I have provided a port 65 in the chamber 52 to communicate to the piston 55 the pressure of the fluid outside the cylinder 10. When the fluid pressure in the cylinder 10 is greater than the fluid pressure outside of said cylinder, the pump piston 55 is moved in one direction and when the pressures in the respective areas are reversed the piston 55 moves in the opposite direction. The constant upward movement of the piston 11 causes the fluid head above the piston to move in unison therewith. Obviously the fluid head above the piston will fill the entire system including the piston chamber 52. Thus the piston 55 in the chamber 52 will reciprocate back and forth with the reciprocations of the piston 11, due to the reactions of the pressures on opposite sides thereof, causing the stem 56 on the piston 55 to move back and forth in the pump chamber 57 and to constantly suck a charge of fluid into the chamber 57 from the source of supply and to discharge the fluid so drawn into the chamber 57 outwardly through the port 64 into the interior of the casing 7.

For normal operation of the apparatus, I would fill the interior of the casing 7 and the space above the piston 11 up to the oil level indicated in Fig. 4 of the drawings. A small amount of air remains in the casing 7 above the fluid level to act as an active cushioning element through movement imparted thereto by the fluid.

I provide an opening 70 in the cylinder 10 that communicates with a port 71 contained in a projection 72 mounted on the outside of the cylinder wall. The port 71 communicates with an air dome 73 that is mounted within the casing 7 on the projection 72. A plunger 74 is reciprocatingly mounted within the port 71, and an expansion spring 75 lies behind the plunger 74 to keep it normally over the cylinder port 70. An adjusting screw 76 is threaded into the casing 72 to regulate the tension on the spring 75 and to regulate the freeness with which the plunger 74 may move in the port 71. The port 71 is connected by a vent passage 77 with the fluid chamber within the casing 7 whereby the said fluid under pressure will enter the port 71 and air dome 73. Fluid under pressure from the cylinder 10 may be by-passed therefrom through the opening 70 past the plunger 74 and outwardly through a manifold 78 into the reservoir 49. A screen 79 is provided around the discharge end of the manifold 78 in the projection 72 to prevent any dirt or foul matter discharged from the cylinder 10 getting back into the source of fluid supply in the reservoir 49.

Assume a vehicle body supported at a normal distance above its axle by this device. When the roadway is smooth, the parts of the device will be positioned as shown in Fig. 2. The air above the fluid level in the casing 7 will be at a normal pressure which transmitted through the fluid to the piston 11 is exactly sufficient to balance the weight of the body above the axle. The air in the cap 9 is also under the same pressure as the air above the fluid level in the casing 7 by reason of the very small hole in the pipe 48 that connects the two chambers. Assume the vehicle wheels to strike a rise in the road; they are forced upward against the inertia of the body, thus instantaneously increasing the pressure of the fluid above the piston 11 in the cylinder 10. This greater than normal pressure at once forces the valve 45 upward as there is only normal pressure above the valve 45; the valve ports 47 and 37, see Fig. 3, are thus brought into registry, and ring valve 39 is also forced open as the pressure on its lower face is greater than normal, and normal on its upper face. Fluid thus passes from cylinder 10 into chamber 7, as long as the vehicle wheels are forced upwardly against the body by the rise in the road.

As the fluid enters the chamber 7 the air therein is gradually compressed and hence the fluid in the cylinder is placed under a greater pressure, exerting a gradually increased pressure between the cylinder head 9 and piston 11. This greater than normal pressure forces the body of the vehicle slightly upwardly out of the horizontal line of its travel so that when the crest of the rise in the road has been reached and the wheels and axle continue on the horizontal line of their travel, the body will have a slight upward momentum away from them; the downward force of the body toward the axle then will be less than the weight of the body by the amount of this momentum. As soon as the crest of the rise is reached, the greater than normal pressure above the piston 11 ceases; but the pressure in the casing head 7 around the cylinder 10 has been increased above normal and hence the ring valve 39 is seated, both by pressure of springs 43 and by the difference in fluid pressure, thereby preventing the excess pressure in the casing 7 from entering the cylinder 10. The fluid pressure in the cylinder 10 is thus now determined by the downward force of the body above the axle, which has been shown to be equal to the weight of the car (balanced by normal pressure) less the value of the upward momentum due to the initial rise. This will be less than the normal pressure always exerted by the air within the head 9 against the upper side of the valve 45, and the valve 45 will be forced downwardly to an extent determined exactly by the value of the upward momentum of the body, thus aligning ports 47 and 38 and thus opening the chamber within the skirt 36 to cylinder 10, (see Fig. 4.) The pressure in the chamber between the skirt 36 and cylinder is less than the pressure in the outside chamber between the skirt 36 and casing which has been increased above normal due to compression and the ring valve 41 will therefore open and fluid will pass into the cylinder 10.

On the return stroke, the fluid pressure exerted on the piston 11 will be, at all times, exactly normal, the excessive pressure within the casing head being relieved through the valve mechanism only fast enough to exactly balance the momentum of the rising body. That this is true, may be appreciated by considering that if the pressure in the cylinder 10 should drop below normal, the valve 45 would be forced downwardly by the normal pressure above it, thus opening ports 47 and 38 and releasing into the cylinder 10 some of the excess pressure in the head 7; that when the pressure in cylinder 10 grows greater than normal, valve 45 is forced upwardly against the normal pressure above it, closing the ports 47 and 38 and shutting off the excess pressure in the casing head.

During the return, then, of the body to its normal distance above the axle when the pressure within the casing head exerted by the fluid against the piston is exactly sufficient to sustain the weight of the body, the supporting pressure exerted by the fluid against the piston is exactly normal, which is sufficient to sustain the weight of the body; and hence momentum will return the body on up to its normal position above the axle with exactly the same velocity of rise as that given it by the initial impetus of the rise in the roadway, rather than with an accelerated velocity as is the case with all other body supporting devices.

The action when the vehicle passes over a drop in the roadway is similar. The diminishing of pressure in the cylinder 10 due to the dropping wheels allow the valve 45 to be forced downwardly by the normal pressure above the valve 45, aligning the ports 47 and 38 and fluid thus passes from the interior of the casing 7 into the cylinder 10 diminishing the pressure on the fluid above the piston and thus diminishing the supporting pressure beneath the body and allowing the body to drop slightly downwardly from the line of its horizontal travel. When the bottom of the drop in the roadway is reached, the wheels will again travel horizontally and the diminishing of pressure in the cylinder 10, due to the dropping, will cease. Valve 41 is instantly closed both by difference in pressure on its opposite faces and by the springs 43, preventing fluid from passing back into the space between the casing and skirt 36. The pressure in the cylinder 10 is thus again determined by the downward force of the body above the axle, which, in this case, is equal to the weight of the body plus the momentum of the downward drop begun by the initial diminishing of the body pressure. This pressure is greater than normal by the amount of the momentum and on the return stroke the valve 45 is forced upwardly against normal pressure above it and fluid is passed through the port 47 and 37, past ring valve 39 and back into the interior of casing 7. During this movement, while the body is returning to its normal distance above the axle, pressure in the cylinder 10 is always exactly normal; greater than normal pressure would be relieved by an upward movement of the valve 45; and less than normal pressure would close the valve mechanism until the moving piston has again brought the pressure up to normal. Hence as the body returns to its normal position its velocity of downward movement is determined entirely by the momentum of its fall during the initial diminishing of pressure; this velocity will thus continue the same until the normal position has been reached, instead of accelerating as is the case with other body supporting devices; and the body will thus drop after the axle, the amount required by the necessity of following the roadway, and no more.

As the device is in operation, more or less rapid successions of differences in pressure on the fluid, within the cylinder 10 and in the casing outside of the cylinder 10, actuate the piston 55 to maintain a pumping action that forces fluid from the reservoir 49 into the acting chambers. To allow the fluid to return to the reservoir 49 when there is sufficient fluid in the operating chamber to maintain the piston 11 at its average normal position within the cylinder 10, the mechanism within the projection 72 has the port 70 positioned substantially opposite the top of the piston 11 when the piston 11 is in its normal position; hence, whenever the piston moves above its normal position, the port 70 is sealed by the piston. From the discussion of the operation of the device, it will be seen that whenever the piston 11 is below its normal position, the pressure of fluid in the cylinder 10 will be less than normal, or just normal; when the piston rises above its normal position, the pressure of fluid in the cylinder 10 will be greater than normal, or just normal.

The pressure within the air dome 73 is maintained at exactly normal by a vent passage 77 and this normal pressure is communicated to the plunger 74 through the fluid. Hence any fluid pressure in the cylinder 10 greater than the normal pressure maintained on the fluid by the air dome, will force the plunger 74 outwardly from the cylinder port 70 and the fluid will be allowed to pass from the cylinder 10 through the port 70 and passage 78 back to the reservoir. Any pressure in the cylinder 10 less than normal, will be insufficient to displace the plunger 74 to pass fluid to the reservoir. Hence, as long as the piston 11 is at its normal average position within the cylinder 11, no fluid will be passed back to the reservoir; as at all piston positions below normal, the pressure within the cylinder 10 will be insufficient to move the plunger 74, and at positions above normal, the port 70 will be closed by the piston 11. When the fluid that is pumped into the operating chambers from the reservoir becomes too great in volume, and forces the normal average position of the piston 11 downwardly, the port 70 will remain unseated during a portion of the upstroke of the piston 11 from this normal position and the greater than normal fluid pressure will be allowed to unseat the plunger 74 and allow the excess fluid to discharge into the reservoir, until the piston 11 has again reached its normal average position. It will be seen that this device will always maintain the piston 11 in the average position in spite of possible leakage or change of load on the vehicle.

When the vehicle load is altered, the average pressure within the head 9 on the upper side of the valve 45, will also gradually change by means of the small hole in vent pipe 48, and the device will therefore function exactly as before. Pressure in air dome 73 will also gradually change to normal through the small vent hole 77, so that the mechanism releasing fluid to the reservoir will function as before. If the load has been increased, it will allow the pumping of fluid from the reservoir to continue until the piston 11 has reached its proper average position; and if the load has been decreased it will return fluid rapidly to the reservoir, allowing the piston to rise to the normal, average position.

Having thus described this invention, what I claim and desire to secure by Letters Patent is:

1. A cushioning device comprised of a pair of telescopically arranged members having the free ends thereof connected to a pair of movable bodies; a cushioning element interposed between the opposite ends of said members; means operable by the cushioning element by reason of an external force applied to one of the members to control directional movement of the cushioning element; and means to check the directional movement of the cushioning element after the initial movement caused by the external force.

2. A cushioning device comprised of a pair of members related at an end thereof and having the non-related ends thereof connected to a pair of movable bodies whereby said members will move relative to each other when actuated by external force applied to either of the movable bodies; a cushioning element to separate the related ends of the pair of members by a pressure equal to any external force exerted between the movable bodies that tends to move the said members together, the pressure of the cushioning element being amenable to variation by change in force transmitted thereto by either of the said members from either of the movable bodies; and means to oppose variations in pressure of the cushioning element to check the movement of the related members after each change in the moving force.

3. A cushioning device comprised of two relatively movable members; an element connected to each of said movable members, each of said elements being movably related to each other; a cushioning medium, to separate the movable elements by a normal pressure equal to the force normally exerted between said elements by external means, said cushioning medium being amenable to variation in pressure by change in force transmitted thereto by either of the movable elements; and means to oppose variations in pressure of the cushioning medium to check the movement of the related elements after each change in the external moving force, the degree of opposition to variations in pressure being proportional to the degree of the changes of the pressures of the cushioning medium.

4. A cushioning device comprised of a casing adapted to contain a fluid, to be attached to a movable body, having a guideway therein, said guideway having a pair of independent ports therein communicating with the interior of the casing; a plunger movably mounted in said guideway to be connected to a movable body; a valve slidably mounted in said guideway having a port therein to register interchangeably with the guideway ports through movement imparted to said valve by the fluid contained within the casing; a baffled passage arranged between the casing and guideway and separating the independent ports in the guideway; a check valve at each of the opposite ends of said passage to permit the flow of fluid in one direction through the passage from one of the guideway ports to the other, said guideway valve and check valves working in relation to each other when actuated by fluid pressure derived from relative movement of either plunger or casing to check the flow of fluid through the baffled passage after the initial movement caused by a moving force applied to the plunger or casing; means in the casing actuated by variations in the pressure of the fluid in the guideway to supply fluid to the casing from a source of fluid supply; and means operable by the relative difference in fluid pressures in the guideway and in the casing to maintain a pressure of fluid in the guideway sufficient to hold the casing and plunger in a predetermined average position of separation.

5. A cushioning device of the class described comprising a casing to contain a fluid, having a guideway therein and a pair of independent passages through said guideway; a piston movable in said guideway, the casing and piston being connected to a pair of movable bodies adapted to be held in a variable separated relation; a ported valve movably mounted in the guideway adjacent the passages therein for the passage of fluid therethrough; pair of check valves yieldably mounted within the casing and associated with a baffle passage to regulate the flow of fluid in one direction, between the independent passages, around the outside of the guideway, said ported valve and check valves and their related connections cooperating with the fluid in the casing and guideway to check the flow of fluid after the initial movement caused by an external force applied to the casing or piston.

6. A cushioning device of the class described comprising a casing to contain a fluid, having a guideway therein and a pair of independent passages through said guideway; a piston movable in said guideway, the casing and piston being connected to a pair of movable bodies adapted to be held in a variable separated relation; a ported valve movably mounted in the guideway adjacent the passages therein for the passage of fluid therethrough; a pair of check valves yieldably mounted within the casing and associated with a baffle passage to regulate the flow of fluid in one direction, between the independent passages, around the outside of the guideway, said ported valve and check valves and their related connections cooperating with the fluid in the casing and guideway to check the flow of fluid after the initial movement caused by an external force applied to the casing or piston; and means in the casing actuated by variations in the pressure of the fluid in the guideway to supply fluid to the casing from a source of fluid supply.

7. A cushioning device of the class described comprising a casing to contain a fluid, having a guideway therein and a pair of independent passages through said guideway, a piston movable in said guideway, the casing and piston being connected to a pair of movable bodies adapted to be held in a variable separated relation; a ported valve movably mounted in the guideway adjacent the passages therein for the passage of fluid therethrough; a pair of check valves yieldably mounted within the casing and associated with a baffle passage to regulate the flow of fluid in one direction, between the independent passages, around the outside of the guideway, said ported valve and check valves and their related connections cooperating with the fluid in the casing and guideway to check the flow of fluid after the initial movement caused by an external force applied to the casing or piston; and means operable by the relative difference in fluid pressures in the guideway and in the casing to maintain a pressure of fluid in the guideway sufficient to hold the casing and piston in a desired average position of separation.

8. A cushioning device comprised of a casing adapted to contain a fluid to be attached to a movable body, having a guideway therein, said guideway having a pair of independent ports therein communicating with the interior of the casing; a plunger movably mounted in said guideway to be connected to a movable body; a valve slidably mounted in said guideway having a port therein to register interchangeably with the guideway ports through movement imparted to said valve by the fluid contained within the casing; a baffled passage arranged between the casing and guideway and separating the independent ports in the guideway; a check valve at each of the opposite ends of said passage to permit the flow of fluid in one direction through the passage from one of the guideway ports to the other, said guideway valve and check valves working in relation to each other when actuated by fluid pressure derived from relative movement of either plunger or casing to check the flow of fluid through the baffled passage after the initial movement caused by a moving force applied to the plunger or casing; and a pump in the casing actuated by variations in the pressure of the fluid in the guideway to supply fluid to the casing from a source of fluid supply.

9. A cushioning device comprised of a casing adapted to contain a fluid to be attached to a movable body, having a guideway therein, said guideway having a pair of independent ports therein communicating with the interior of the casing; a plunger movably mounted in said guideway to be connected to a movable body; a valve slidably mounted in said guideway having a port therein to register interchangeably with the guideway ports through movement imparted to said valve by the fluid contained within the casing; a baffled passage arranged between the casing and guideway and separating the independent ports in the guideway; a check valve at each of the opposite ends of said passage to permit the flow of fluid in one direction through the passage from one of the guideway ports to the other, said guideway valve and check valves working in relation to each other when actuated by fluid pressure derived from relative movement of either plunger or casing to check the flow of fluid through the baffled passage after the initial movement caused by a moving force applied to the plunger or casing; and an equalizing device interposed between the guideway and casing and operable by the relative difference in fluid pressures in the guideway and casing to maintain a pressure of fluid in the guideway sufficient to hold the casing and plunger in a desired average position of separation.

10. A cushioning device comprised of a casing adapted to contain a fluid to be attached to a movable body having a guideway therein, said guideway having a pair of independent ports therein communicating with the interior of the casing; a plunger movably mounted in said guideway to be connected to a movable body; a valve slidably mounted in said guideway having a port therein to register interchangeably with the guideway ports through movement imparted to said valve by the fluid contained within the casing; a baffled passage arranged between the casing and guideway and separating the independent ports in the guideway; a check valve at each of the opposite ends of said passage to permit the flow of fluid in one direction through the passage from one of the guideway ports to the other, said guideway valve and check valves working in relation to each other when actuated by a fluid pressure derived from relative movement of either plunger or casing to check the flow of fluid through the baffled passage after the initial movement caused by a moving force applied to the plunger or casing; a pump in the casing actuated by variations in the pressure of the fluid in the guideway to supply fluid to the casing from a source of fluid supply; and an equalizing device interposed between the guideway and casing and operable by the relative difference in fluid pressures in the guideway and casing to maintain a pressure of fluid in the guideway sufficient to hold the casing and plunger in a desired average position of separation.

11. A unitary device for both yieldingly supporting a vehicle body from its axle and controlling the relative movements thereof, comprising relatively movable elements connected respectively to said body and axle, an elastic fluid cushioning element interposed between said movable elements, and means to control the action of said cushioning element to check the return of said relatively movable elements in either direction to normal position after an initial relative movement therebetween in either direction away from said normal position.

12. A unitary device connecting two movable bodies acting both yieldingly to support one from the other at a predetermined normal average position, and to control the relative movements thereof, comprising relatively movable elements connected to said movable bodies, an elastic cushioning element interposed between said movable elements, and means controlled by the force existing between said movable elements following each initial relative movement away from said predetermined normal position of said relatively movable elements, acting to cause the cushioning element to check the return of said elements to said predetermined normal position.

13. The combination of a vehicle having body and axle members, a connector to permit unrestricted relative movement therebetween away from normal position toward and from each other and to restrict said relative movement toward normal position, and a unitary device having elements acting both yieldingly to support said body from said axle, and to check the movement thereof when returning to normal position after an initial yielding movement therebetween.

14. A unitary device connecting two movable bodies acting both yieldingly to support one from the other and to control the relative movements thereof, comprising relatively movable elements connected to said movable bodies, an elastic fluid cushioning element interposed between said movable elements, means controlled by the force existing between said movable elements following each initial relative movement of said relatively movable elements, and acting to cause the cushioning element to check the return of the movable elements to a normal average position, and means to maintain said elastic cushioning element under pressure sufficient to hold the two bodies in said normal average position.

15. A unitary device to both yieldingly support a vehicle body from its axle and to control the relative movements thereof comprising telescoping elements having a predetermined normal average position, and connected respectively to the body and axle, an elastic fluid cushioning element interposed between said telescoping elements and means acting automatically following each initial movement of the telescoping elements to cause said cushioning elements to check the return movement of said elements to said normal average position.

16. A unitary device to both yieldingly support a vehicle body from its axle and to control the relative movements thereof, comprising telescoping elements connected respectively to the body and axle, an elastic fluid cushioning element interposed between said telescoping elements, and normally under a pressure sufficient to maintain said telescoping elements in a predetermined average position, means automatically to maintain such pressure and means acting after each initial relative movement of said telescoping elements to check the return movement thereof to said average position.

17. A unitary device to both yieldingly support a vehicle body from its axle and to control the relative movements thereof comprising telescoping elements having a predetermined normal average position, and connected respectively to the body and axle, an elastic fluid cushioning element interposed between said telescoping elements, and means controlled by the forces existing between said telescoping elements acting after each initial relative movement of the telescoping elements in either direction to cause said cushioning element to check the return movement of said elements to said normal average position.

18. A unitary device comprising a plurality of elements, means for connecting one of said elements to one of two relatively movable bodies and another of said elements to the other movable body, and means acting to cause the said plurality of elements yieldingly to support one of said bodies from the other and to check the return movement between the bodies after any initial yielding movement therebetween.

19. A unitary device comprising a plurality of elements, means for connecting one of said elements to one of two relatively movable bodies and another of said elements to the other movable body, and means acting to cause said plurality of elements both yieldingly to support one of said bodies upon the other and to check the movement of said bodies when returning to normal position following any initial yielding movement therebetween.

20. A unitary device comprising two relatively movable elements, means for conecting one of said elements to one of two relatively movable bodies and the other of said elements to the other movable body, and means acting to cause said elements to separate said bodies with a force at all times constant except during any relative movement of said bodies away from a predetermined normal position.

21. A unitary device comprising two relatively movable elements, means for connecting one of said elements to the body member and the other to the axle member of a vehicle, and means acting to cause said elements to separate said body and axle members with a force at all times constant except during any relative movement of the body and axle members away from a predetermined normal position regardless of the load on the vehicle body.

22. A unitary device comprising two relatively movable elements, means for connecting one of said elements to one of two relatively movable bodies and the other of said elements to the other movable body, and means acting to cause said elements yieldingly to support one of said bodies upon the other with the bodies a normal average distance apart and acting to check the movement of said bodies when returning to said normal average position after any initial yielding movement between the bodies.

23. A unitary device comprising two relatively movable elements, means for connecting one of said elements to one of two relatively movable bodies and the other of said elements to the other movable body, and means acting to cause said elements yieldingly to support one of said bodies from the other and acting after any initial relative movement between said bodies to check their return to normal position.

24. A unitary device comprising two telescoping elements, an elastic cushioning element interposed between said telescoping elements, means for connecting one of said telescoping elements to one of two relatively movable bodies and the other telescoping element to the other movable body, and means acting to cause said telescoping elements and said interposed element both yieldingly to support one of said bodies from the other and to check the return movement of the said bodies to normal position after an initial yielding movement therebetween.

GROSVENOR M. CROSS.